United States Patent [19]
Masuda

[11] Patent Number: 5,564,576
[45] Date of Patent: Oct. 15, 1996

[54] CLAMP FOR AND METHOD OF STORING/TRANSPORTING HIGH-PRESSURE FUEL INJECTION PIPES

[75] Inventor: Kenichi Masuda, West Bloomfield, Mich.

[73] Assignee: USUI Kokusai Sangyo Kaisha Ltd., Japan

[21] Appl. No.: 259,190

[22] Filed: Jun. 13, 1994

[51] Int. Cl.$^6$ ................................................ A47F 7/00
[52] U.S. Cl. ................................................ 211/60.1
[58] Field of Search ................................ 211/60.1, 70.4; 248/68.1, 69, 61.7, 74.1, 74.4, 65; 24/514, 517, 569

[56] References Cited

U.S. PATENT DOCUMENTS

| | | | |
|---|---|---|---|
| 2,890,848 | 6/1959 | Johnson, Jr. | 248/74.4 |
| 3,568,264 | 3/1971 | Crist et al. | 24/517 X |
| 4,799,641 | 1/1989 | Koreski | 248/68.1 |
| 4,824,066 | 4/1989 | Smith | 248/500 |
| 5,060,810 | 10/1991 | Jones | 211/59.4 |
| 5,071,169 | 12/1991 | Moschet | 285/62 |
| 5,098,047 | 3/1992 | Plumley | 248/68.1 |
| 5,377,939 | 1/1995 | Kirma | 248/68.1 |

FOREIGN PATENT DOCUMENTS 62-45490  3/1987  Japan .

*Primary Examiner*—Alvin C. Chin-Shue
*Assistant Examiner*—Sarah L. Purol
*Attorney, Agent, or Firm*—Anthony J. Casella; Gerald E. Hespos

[57] ABSTRACT

In either clamping or assembling holes of grooves formed in supports or assembling holes in a support at an interval equal to the mounting pitch of an injection pump, there are arrayed and set either the connecting head portions of a set of bent injection pipes in the vicinity of the backs of mounting nuts, as located at least at the side of the injection pump, or the connecting heads themselves. After this, the injection pipes are fixed and held by retaining means of by fastening mounting nuts assembled on the injection pipes, so that they may be prepared for the storage/transportation.

Thus, according to the present invention, the supports can be prevented from coming out or getting lost while they are being stored/transported, and the products can be prevented from being deformed by an external impact or by handling them. Moreover, the injection pipes can be easily attached altogether to at least to the injection pump when they are to be mounted on an engine assembling line, so that their mounting operations can be accomplished conveniently and efficiently. Still moreover, the injection pipes can be stored/transported such that they are kept clean while being prevented from any invasion of dust or foreign substance.

7 Claims, 6 Drawing Sheets

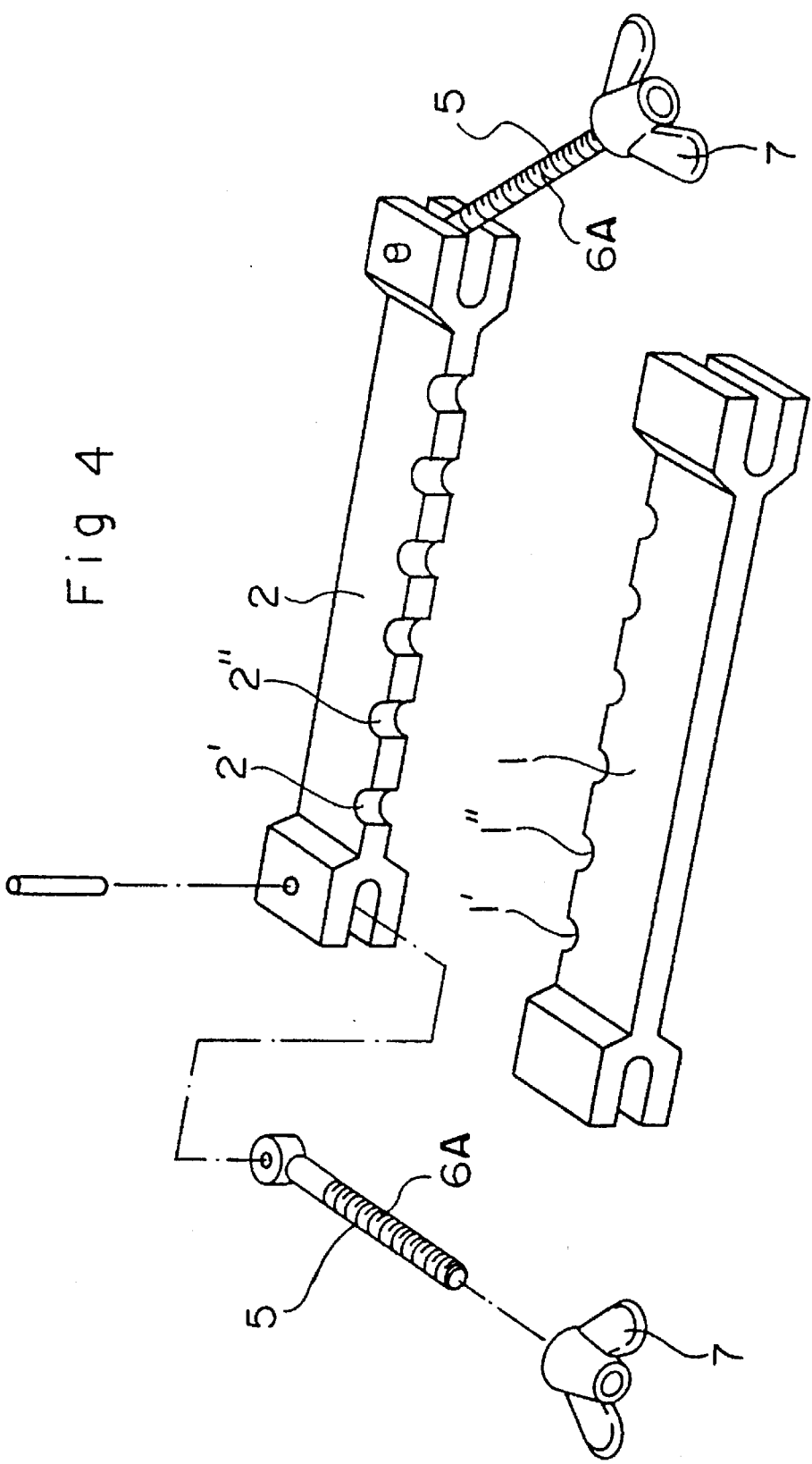

CLAMP FOR AND METHOD OF STORING/TRANSPORTING HIGH-PRESSURE FUEL INJECTION PIPES

BACKGROUND OF THE INVENTION

1. Field of the Invention

The present invention relates to a clamp for and a method of storing/transporting high-pressure fuel injection pipes which are bent and arranged in a set state as fuel supply passages between the fuel injection pump and the cylinders of a Diesel internal combustion engine.

2. Description of the Prior Art

In the prior art, there is found no storing/ transporting clamp and method of this kind using a special support for the injection pipes. Thus, what is achieved at present is to store/transport a plurality of bent pipes (P, $P_1$, - - -, and so on) with fixing clamps (C) for bundling and clamping the intermediate straight portions of the pipes, as shown in FIG. 9, or to use the fixing clamp for concentrated piping (as shown in FIG. 10), as proposed by us in Japanese Utility Model Laid-Open No. 45490/1987.

In the clamp (C) used here, as shown in FIG. 10, a plurality of pipes (P, $P_1$, - - -, and so on) are arrayed, while having their suitable midway portions bundled, in through holes (30,30', - - -, and so on) which are formed by overlaying two opposed support members (10, 20) which are formed in their longitudinal side walls with comb-tooth grooves (10',10", - - -, and so on) (20',20", - - -, and so on), and these support members (10, 20) are fixed to each other by retaining means (40) which are disposed at the facing positions of the opposed faces.

In the prior art using such fixing clamps (C), however, various disadvantages have been frequently invited in connection with the identical mounting pitches at the connecting heads of the pipes (P, $P_1$, ..., and so on). Specifically, those clamps (C) themselves are mounted on the base by mounting holes (70) while clamping the pipes (P, $P_1$, - - -, and so on) by themselves. As a result, the retaining means (40) may be sufficiently composed of rivet-shaped heads (50) at one side and grooves (60) to engage with the heads (50). While the injection pipes are being clamped or stored/transported, the aforementioned retaining means may often go out of position to invite a problem that the support members (10, 20) go out of position or get lost. Accordingly, there arises another problem that the dust or foreign substance may be allowed to invade from the connecting heads at the pipe ends to deteriorate the cleanness in the pipes.

SUMMARY OF THE INVENTION

The present invention has been conceived in view of the aforementioned problems intrinsic to the prior art and has an object to propose a clamp for and a method of storing/ transporting high-pressure fuel injection pipes, which has its retaining means specialized as a clamp for the injection pipes and ensured for preventing the pipes from coming out or getting lost, which enables the injection pipes to be mounted on the injection pump on an engine assembling line by fixing the pipes which are arranged at an interval equal to the mounting pitch at the injection pump side and with their connecting heads being arrayed with equal projections and the supports to be demounted, if necessary, so that the mounting operations can be accomplished remarkably conveniently and efficiently and so that the individual injection pipes can be easily mounted without any rotational displacement of position and in alignment with the positions of the nozzle holders at the cylinders of the engine, and which can keep the pipe insides clean while preventing an invasion of dust or foreign substance from the pipe end portions.

In order to achieve the above-specified object, according to a first mode of the present invention, there is provided a clamp for storing/transporting high-pressure fuel injection pipes, comprising: a pair of planar supports individually having a plurality of grooves formed in their side end edges and opposed to each other at an interval equal to the mounting pitch of an injection pump; and retaining means for retaining said planar supports removably. According to a second mode, there is provided a clamp for storing/ transporting high-pressure fuel injection pipes, comprising: a single planar support having a plurality of bottomed assembling holes of a predetermined depth formed in its surface and arranged at an interval equal to the mounting pitch at the side of an injection pump for setting the individual connecting heads of said injection pipes; and a plurality of mounting nuts fitted on said injection pipes, wherein said assembling holes are formed at least in their two end portions with threaded portions for fastening said mounting nuts. According to a third mode, there is provided a method of storing/ transporting high-pressure fuel injection pipes, comprising: arraying and setting a set of bent injection pipes in the vicinity of the backs of mounting nuts, which are assembled on their connecting heads at their one ends located at least at an injection pump, in clamping or assembling holes which are formed in a pair of planar supports at an interval equal to the mounting pitch at the side of said injection pump; and storing/transporting said injection pipes while being clamped in the vicinity of said backs. According to a fourth mode, there is provided a method of storing/transporting high-pressure fuel injection pipes, comprising: arraying and setting the individual connecting heads at the individual one ends of a set of bent injection pipes, as located at least at an injection pump, in bottomed assembling holes which are formed in the surface of a single planar support at an interval equal to the mounting pitch at the side of said injection pump; and storing/ transporting said injection pipes while being clamped at least at their two end portions by mounting nuts. Moreover, said plurality of injection pipes are clamped at their intermediate straight portions by fixing clamps.

According to the storing/transporting clamp and method of the present invention, a set of bent injection pipes are stored/transported in their set state such that they are held on the supports by the retaining means or directly by their mounting nuts. Thanks to the reliable fixtures on the supports, therefore, the supports can be prevented from coming out or getting lost during the storage/transportation, and the products can be kept away from any deformation that might otherwise be caused by an external impact or handling. Moreover, the injection pipes, which are clamped and arrayed on a line at an interval equal to the mounting pitch at the side of the injection pump and with a constant projection of their connecting heads, are mounted instantly altogether on at least the injection pump while being in the fixed and held state, or the supports are then removed, if desired, so that the mounting operations can be accomplished remarkably conveniently and efficiently and so that the individual injection pipes are kept away from any rotational position displacement. By using the fixing clamps, if desired, the injection pipes can be easily mounted in alignment with the positions of the nozzle holders at the cylinders of the engine. If, furthermore, the injection pipes are stored/transported by setting their heads in the bottomed assembling holes of the planar support, they can be kept away from any invasion of dust or foreign substance into their insides.

BRIEF DESCRIPTION OF THE DRAWINGS

FIG. 4 is a perspective view showing only a clamp of FIG. 3.

DETAILED DESCRIPTION OF THE PREFERRED EMBODIMENTS

Figure 1:
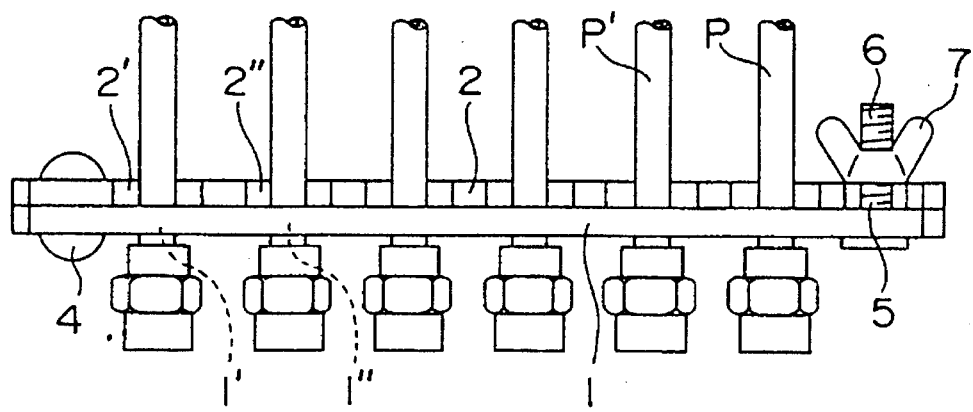
FIG. 1 is a front elevation showing a storing/transporting state of a support of a clamp for and a method of storing/transporting high-pressure fuel injection pipes according to an embodiment of the present invention.
Figure 2:
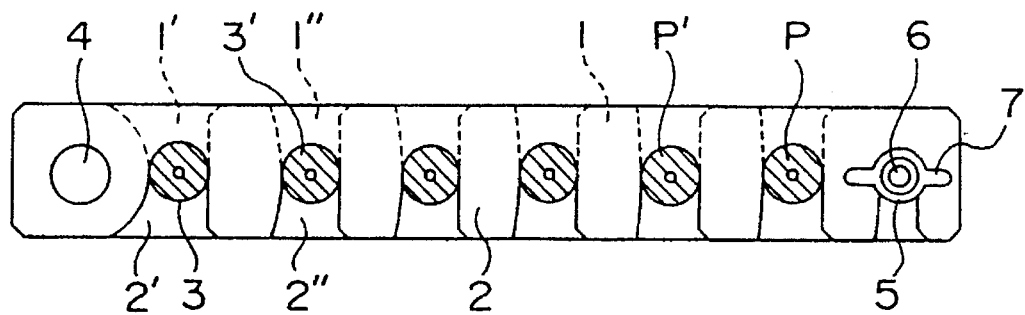
FIG. 2 is a top plan view of FIG. 1.
Figure 3:
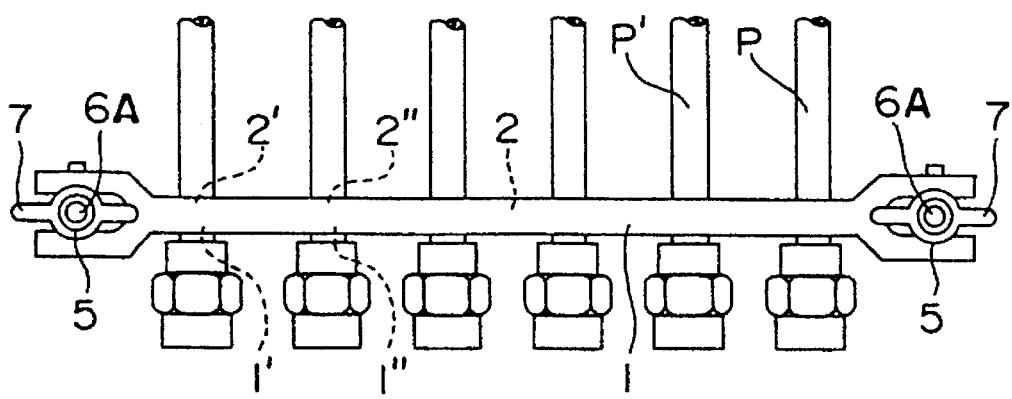
FIG. 3 is a front elevation similar to FIG. 1 but shows another embodiment.
Figure 5A:
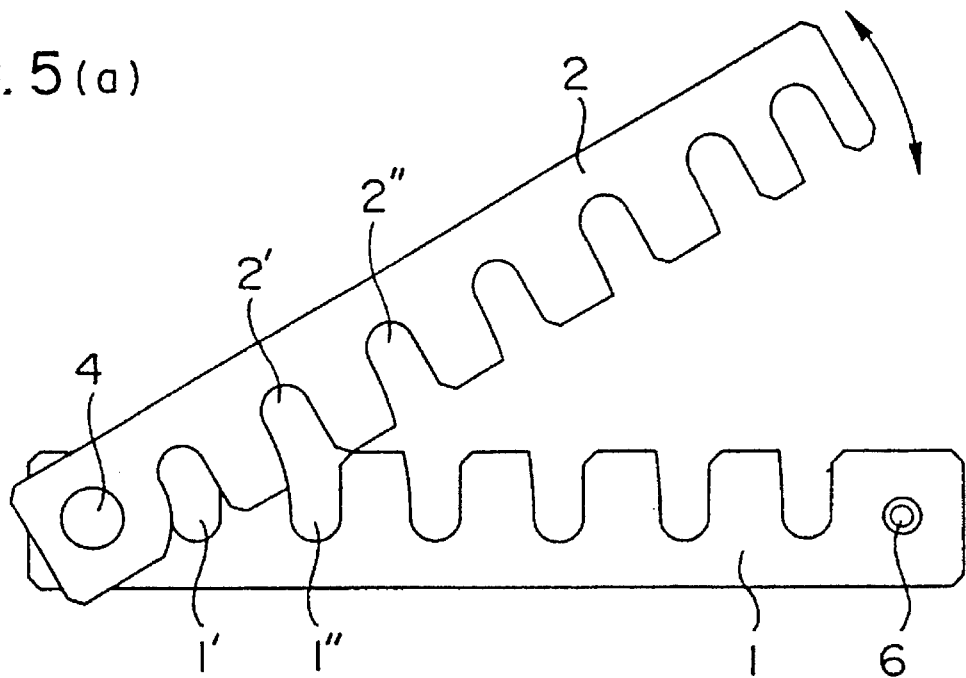
In FIG. 5 showing the clamping operations of only a support, (a) presents a view showing the embodiment of FIG. 1, and (b) presents a view showing the other embodiment.
Figure 5B:
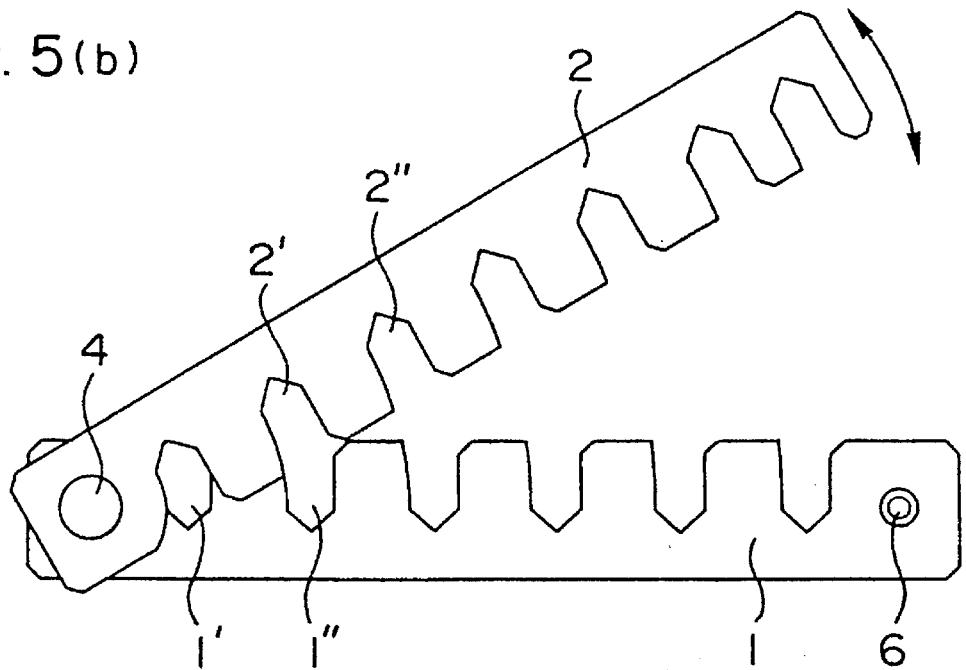

The present invention will be described in the following in connection with its embodiments with reference to FIGS. 1 to 8. Reference numerals (1) and (2l) designate a pair of upper and lower or right and left planar supports, which are made of a metal such as iron, aluminum or bronze or a synthetic resin such as vinyl chloride, propylene or polyamide. These planar supports (1) and (2) are formed in their opposed side end edges with generally U-shaped (as shown at (a) in FIG. 5), V-shaped (as shown at (b) in FIG. 5) or semicircular (as shown in FIG. 4) grooves (1', 1", - - - , and so on) and (2', 2", - - - , and so on), which are arranged at the same interval as the mounting pitch of injection pumps used in an engine. The planar supports (1) and (2l) are removably retained by retaining means (5). In the embodiment shown in FIGS. 1 and 2, the retaining means (5) is composed of a pin (4) fitted in one end of the planar supports (1) and (2), and a bolt (6) and a butterfly nut (7) attached to the other end for retaining the planar supports (1) and (2) removably. In the embodiment shown in FIGS. 3 and 4, on the other hand, the retaining means (5) is composed of eye bolts (6A) attached to the two ends of the planar supports (1) and (2) for bringing the same into and out of contact with each other while opposing their side end edges to each other. When the supports (1) and (2) are clamped or brought to abut against each other, there are formed clamping or assembling holes (3, 3', - - - , and so on). In these holes (3, 3', - - - , and so on), there are arrayed on line a set of individually bent injection pipes (P, P', - - - , and so on) in the vicinity of the backs of mounting nuts which are assembled on the individual connecting heads, as located at the side of the (not-shown) injection pump, with their heads being arranged in their projections and at the same interval as the mounting pitch at the pump side. After this, the injection pipes (P, P', - - - , and so on) thus fixed and held by fastening the aforementioned retaining means (5) are ready for their storage/transportation. Moreover, the injection pipes (P, P', - - - , and so on) are assembled altogether at the side of the injection pump on the engine assembly line and are then reused, if necessary, by loosening the supports (1) and (2).

Figure 6:
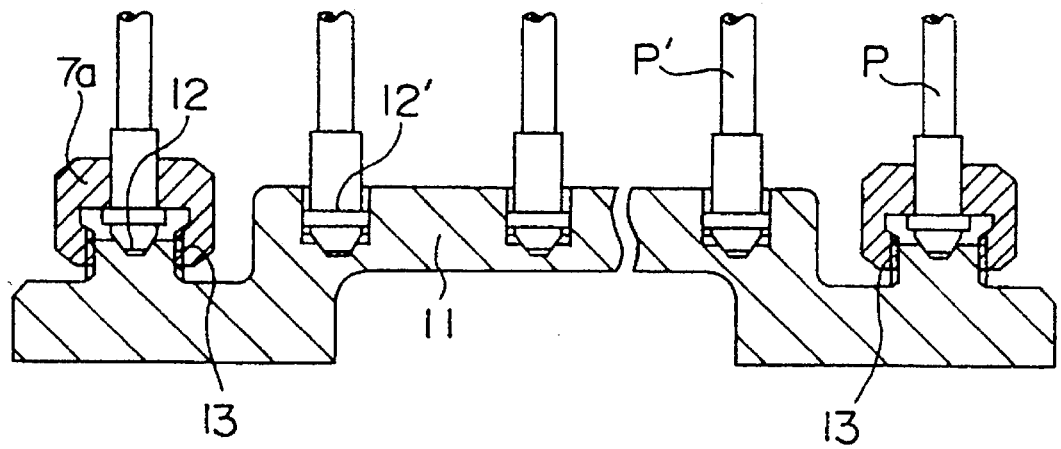
FIG. 6 is a longitudinal section showing a portion of a support according to still another embodiment.
Figure 7:
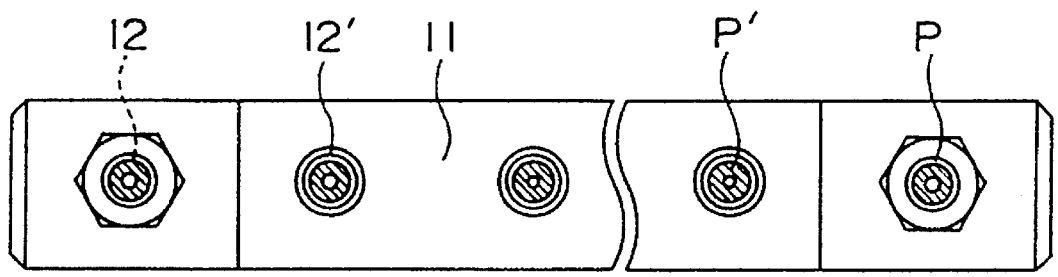
FIG. 7 is a top plan view of FIG. 6.
Figure 8:
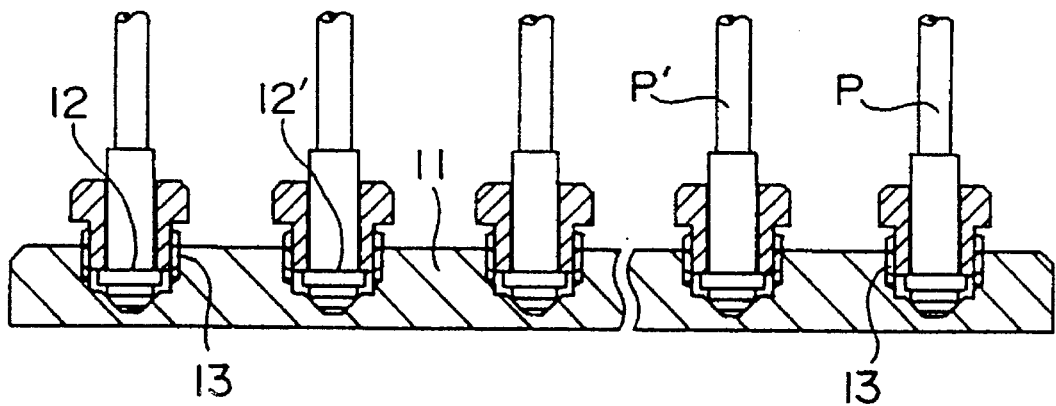
FIG. 8 is a longitudinal section showing a portion of a support according to a further embodiment.

According to another embodiment, as shown in FIGS. 6 to 8, a support (11) is composed of a single plate made of the same material as that of the foregoing embodiment. This support (11) is formed on line in its surface with a plurality of bottomed assembling holes (12, 12', - - - , and so on) which have a constant depth sufficient for setting the connecting heads of the injection pipes (P, P', - - - , and so on) and which are held at the same interval as the mounting pitch at the side of the injection pump. The injection pipes (P, P', - - - , and so on) have their connecting heads inserted into and arrayed in those assembling holes, and are fixed by fastening either cap nuts (7a), which are fitted on the two end sides of the injection pipes (P, P', - - - , and so on), on threaded portions (13) formed in the assembling holes (12, 12', - - - , and so on) (as shown in FIGS. 6 and 7) or externally threaded nuts (7b) (as shown in FIG. 8).

Figure 9:
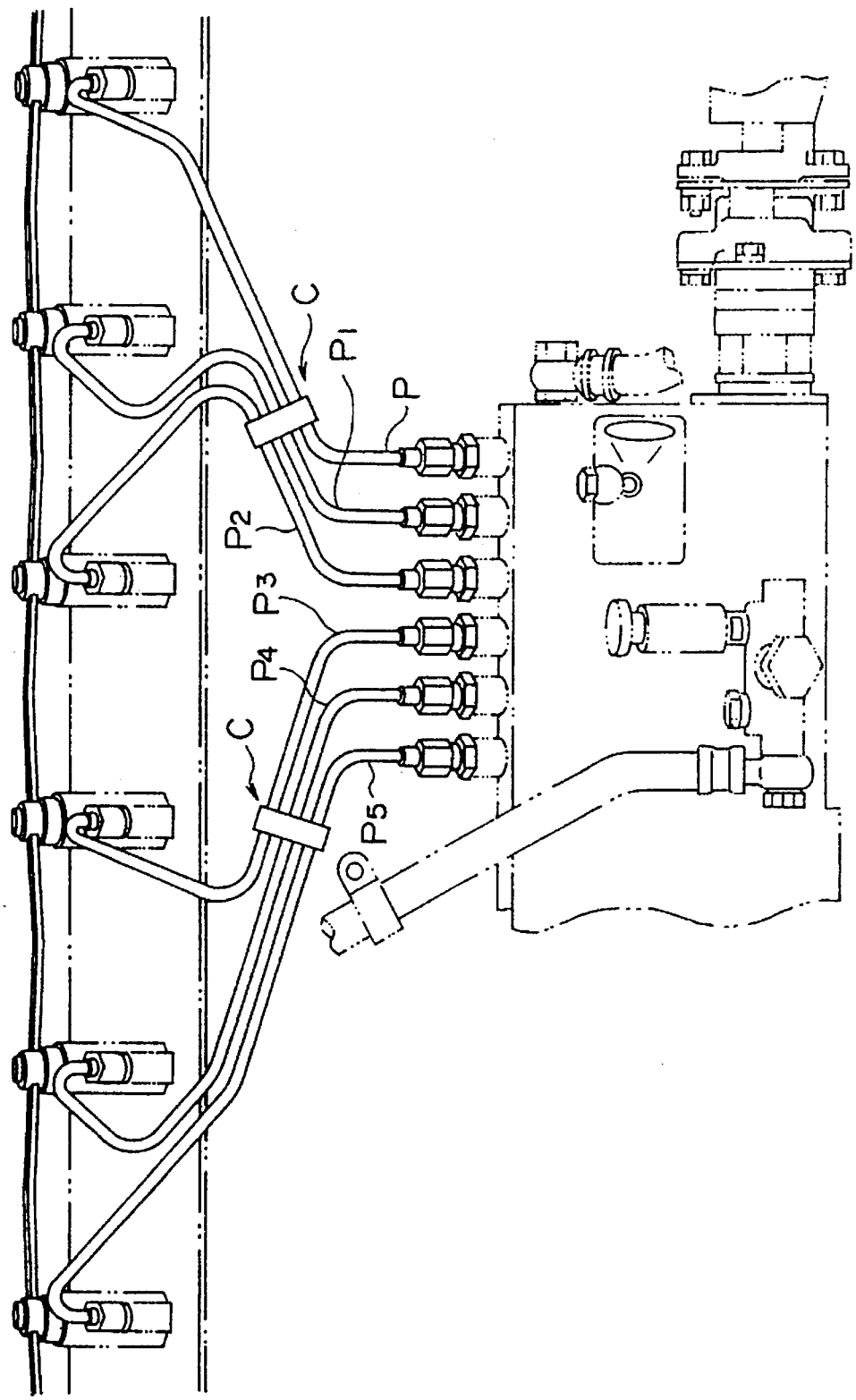
FIG. 9 is a perspective view showing a used state of the example of the prior art.
Figure 10:
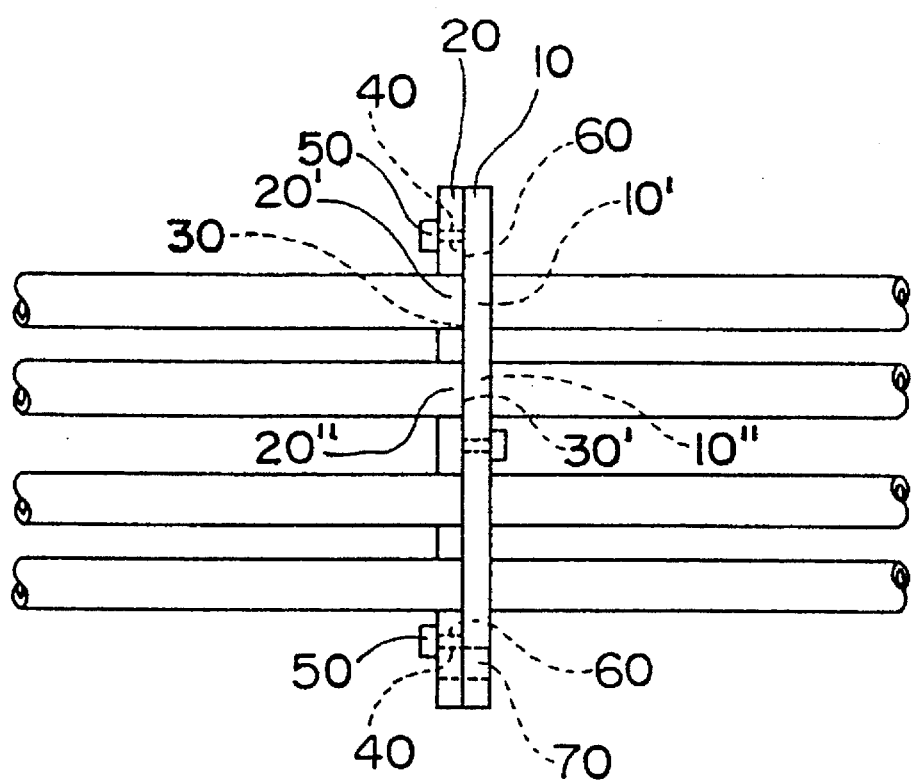
FIG. 10 a front elevation of a fixing clamp of FIG. 9.

Incidentally, if fixing clamps (C), as shown in FIG. 9, are used in the air for clamping the intermediate straight portions of the injection pipes (P, P', - - - , and so on) in any of the foregoing embodiments, the injection pipes (P, P', - - - , and so on) can be smoothly and efficiently assembled on the engine assembly line while having neither their intermediate portions coming out of the support (11) nor their pitches or directions changed at the terminals at the side of not only the injection pump but also the injection nozzles. At the same time, the connecting heads can be prevented from going out of position if handled during the storage/transportation. Moreover, the injection pipes (P, P', - - - , and so on) can be kept away of any invasion of dust or foreign substance if the embodiment of FIGS. 6 to 8 is employed.

According to the clamp for and the method of storing/transporting the high-pressure fuel injection pipes of the present invention, as has been described hereinbefore, a set of injection pipes (P, P', - - - , and so on) are stored/transported by the aforementioned support (1) and (2), or (11) such that their connecting heads located at least at the injection pump are arrayed in the vicinity of the mounting nuts. As a result, by the reliable retaining means (5), the support (1) and (2), or (11) itself can be prevented from coming out or getting lost, and the products can be prevented from being deformed by an external impact or handling while they are being stored/transported. Since, moreover, the injection pipes (P, P', - - - , and so on) are attached altogether to at least the injection pump while being in the aforementioned fixed state, this attachment can be accomplished remarkably conveniently and efficiently without any difficulty while preventing the injection pipes (P, P', - - - , and so on) from rotationally going out of position. If desired, still moreover, the injection pipes (P, P', - - - , and so on) can be fixed in alignment with the nozzle holes in the cylinder portions at the engine side by using the fixing clamp (C). Furthermore, the construction can be kept clean by preventing the invasion of dust or foreign substance. Thus, the present invention can provide a remarkably useful clamp for and a remarkably useful method of storing/transporting the high-pressure fuel injection pipes.

I claim:

1. A clamp for securely clamping a plurality of fuel injection pipes at a selected spacing from one another for storage and transportation, said clamp comprising: first and second elongate supports, each said elongate support having opposed first and second longitudinal ends, a first planar surface extending between said ends, an opposed second surface and first and second side edges, the first planar surfaces of said elongate supports being in opposed facing relationship to one another, a pivot pin orthogonal to said first planar surfaces and pivotably securing the respective first ends of said elongate supports to one another such that said planar supports are pivotable from an open position where the second longitudinal ends of said elongate supports are angularly separated from one another to a closed position where said second longitudinal ends of said elongate supports are substantially registered, a plurality of grooves formed in the respective first side edges of the elongate supports, said grooves being spaced at the selected spacing of said pipes, each said groove comprising a first side edge convexly generated about said pivot pin, a second side edge spaced from said first side edge and a concave base edge extending therebetween such that said first side edge of each said groove is closest to said second side edge at locations adjacent said concave base edge, said edges of each said groove being configured to grippingly engage one said pipe adjacent the concave base edge thereof, said second longitudinal end of each said elongate support having an adjustable retainer for adjustably retaining said elongate supports at a selected pivotable position for tightly clamping said pipes in the grooves and between the elongate supports of said clamp.

2. A clamp according to claim 1, wherein the adjustable retainer comprises an aperture formed through said first elongate support in proximity to the second end thereof, a notch formed into the first side edge of the second elongate support in proximity to the second end thereof such that the notch is registrable with the aperture, and a bolt passing through said aperture and receivable in said notch and a nut threadedly engaging said bolt for securing said elongate supports in a selected angular orientation in proximity to said closed position.

3. A clamp according to claim 1, wherein the base edges of said grooves are formed into a "V" shape.

4. A clamp according to claim 1, wherein said supports are made of a synthetic resin.

5. A clamp according to claim 1, wherein the second side edge of each said groove is substantially linear and orthogonal to said pivot pin.

6. A clamp according to claim 1, wherein the base edges of said grooves are of a semicircular shape.

7. A clamp according to claim 1, wherein said supports are made of a metal.

* * * * *